E. A. EMERY.
FLUID PRESSURE BRAKE DEVICE.
APPLICATION FILED MAR. 31, 1910.
1,004,000.
Patented Sept. 26, 1911.
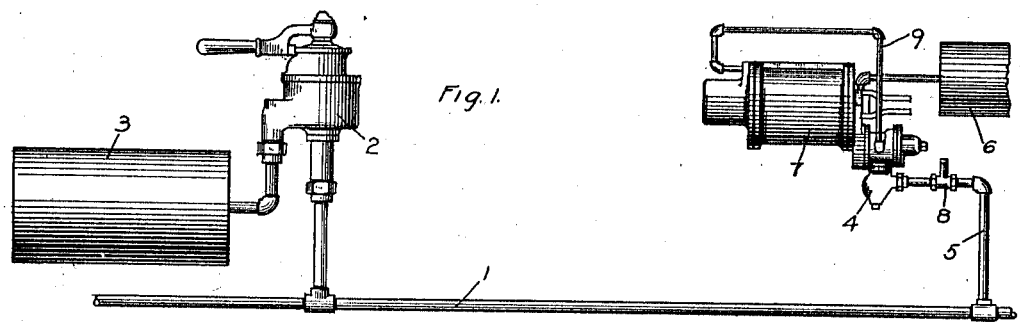
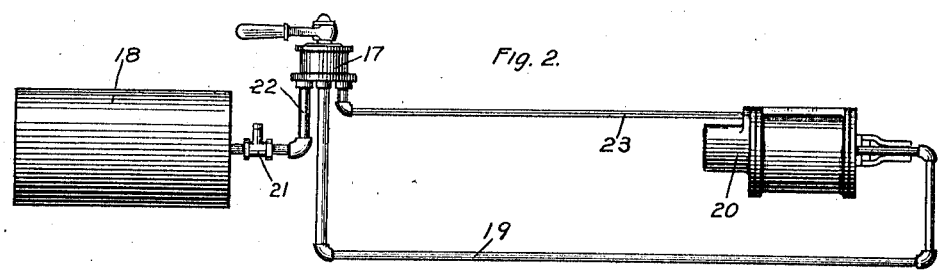
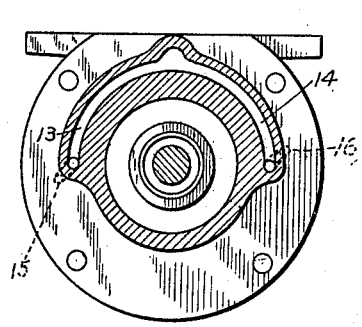
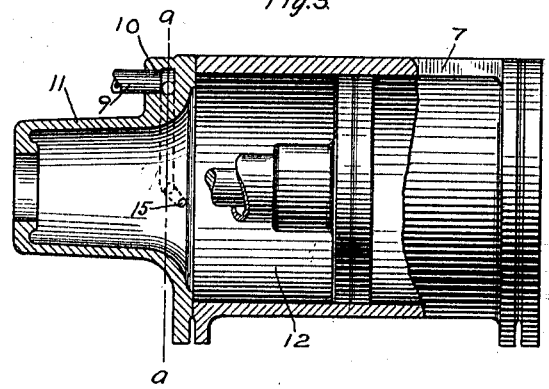
WITNESSES
INVENTOR
Edwin A. Emery
by E. Wright
Att'y.

UNITED STATES PATENT OFFICE.

EDWIN A. EMERY, OF ST. LOUIS, MISSOURI, ASSIGNOR TO THE EMERY PNEUMATIC LUBRICATOR COMPANY, A CORPORATION OF COLORADO.

FLUID-PRESSURE BRAKE DEVICE.

1,004,000.  Specification of Letters Patent.  Patented Sept. 26, 1911.

Application filed March 31, 1910. Serial No. 552,678.

*To all whom it may concern:*

Be it known that I, EDWIN A. EMERY, a citizen of the United States, residing at St. Louis, in the State of Missouri, have invented new and useful Improvements in Fluid-Pressure Brake Devices, of which the following is a specification.

This invention relates to fluid pressure brakes, and more particularly to means for lubricating the brake cylinder and for maintaining the same free from dirt and foreign matter.

It has heretofore been proposed to conduct the exhaust air from the brake cylinder in releasing the brakes to the chamber at the non-pressure side of the brake piston, so that instead of sucking in the dust laden air around the piston stem as the brake piston moves to release position, the exhaust air, being admitted to the non-pressure piston chamber, blows out and thereby prevents the entrance of dust and dirt from the external air. Furthermore, this venting of air to the non-pressure side of the brake piston aids in releasing the brakes, as will be apparent.

Accordingly, one object of my invention is to provide improved means for venting exhaust air from the brake cylinder to the chamber at the non-pressure side of the brake piston.

Another object of my improvement contemplates utilizing the exhaust air vented to the non-pressure side of the brake piston as a medium for lubricating the brake cylinder. By this means, the brake cylinder walls may be thoroughly lubricated while excluding dirt from the brake cylinder and furthermore, rusting of the walls of the brake cylinder is prevented.

In the accompanying drawing; Figure 1 is a diagrammatic view of an automatic brake equipment for a car, embodying one form of my improvement; Fig. 2 a similar view of a straight air brake equipment for a car, with my invention applied thereto; Fig. 3 a central sectional view of a brake cylinder constructed in accordance with my invention; and Fig. 4 a section on the line *a—a* of Fig. 3.

According to Fig. 1 of the drawing, my improvement is shown applied to an automatic brake equipment on a motor car, comprising the usual train pipe 1, engineer's brake valve 2, main reservoir 3, triple valve device 4, connected to the train pipe 1 by a branch pipe 5, auxiliary reservoir 6, and brake cylinder 7.

In the branch pipe 5 is located a lubricator 8, preferably of the type in which the lubricant is dissolved by a current of compressed air and is then conveyed by said current to the parts to be lubricated, and as covered in my prior Patent No. 827,519 of July 31, 1906.

A pipe 9 is connected to the exhaust port of the triple valve 4 and leads to a passage 10 in the non-pressure head 11 of the brake cylinder 7. As shown in Figs. 3 and 4, this passage 10 may have two branches 13 and 14, opening into the non-pressure chamber 12 of the brake cylinder at diametrically opposite points. The nozzle outlets 15 and 16 of the respective branch passages 13 and 14 are so disposed that the current of air is directed to the inner walls of the brake cylinder spirally, one upwardly and the other downwardly, so that the air is caused to swirl around the walls of the brake cylinder. Thus the air carrying the lubricant is evenly distributed on the brake cylinder walls and the thorough lubrication of the brake cylinder is assured.

It will now be evident that the exhaust fluid from the brake cylinder, flowing through pipe 9 from the triple valve exhaust port will sweep around on the inner walls of the brake cylinder and thereby clean off any particles of dirt which may adhere to the walls, the air finally escaping to the atmosphere around the brake piston stem. The lubricant charged into the air by the action of the lubricator 8 is also carried to the walls of the brake cylinder and by reason of the above described swirling action of the air thoroughly lubricates the walls of the brake cylinder. While lubrication of the cylinder walls could be effected to some extent regardless of the particular manner in which the air is admitted to the brake cylinder non-pressure head, a more effective lubrication is secured by arranging the outlet nozzles 15 and 16 as hereinbefore described.

In Fig. 2 is illustrated a straight air brake equipment comprising a straight air brake valve 17, main reservoir 18, and straight air pipe 19, connected to the brake cylinder 20. In this case a lubricator 21 is shown interposed in the supply pipe 22 leading from the main reservoir 18 to the brake valve 17, while the exhaust from the brake valve, through which air is released from the brake cylinder 20, is connected by a pipe 23 to the non-pressure head of the brake cylinder 20.

The exhaust outlet nozzles are arranged in the non-pressure head of the straight air brake cylinder 20 as hereinbefore described in connection with Fig. 1, and it will be evident that the operation is the same, the lubricant in the air as supplied from the lubricator 21 being conveyed with the exhaust from the brake cylinder to the non-pressure chamber of the brake cylinder.

Having now described my invention, what I claim as new and desire to secure by Letters Patent, is:—

1. In a fluid pressure brake, the combination with a brake cylinder and means for charging the air in the brake system with a lubricant, of means for conveying the exhaust air from the brake cylinder to the chamber at the non-pressure side of the brake piston.

2. In a fluid pressure brake, the combination with a brake cylinder and a lubricator device for charging the air in the brake system with a lubricant, of means for discharging air in releasing the brakes to the chamber at the non-pressure side of the brake piston.

3. In a fluid pressure brake, the combination with a brake cylinder, train pipe, and triple valve, of a lubricator device for charging the fluid in the brake system with a lubricant and means for connecting the exhaust port of the triple valve to the non-pressure chamber of the brake cylinder, to thereby lubricate the brake cylinder by means of the exhaust air from the brake cylinder and also prevent the entrance of dirt.

4. In a fluid pressure brake, the combination with a brake cylinder, train pipe, and triple valve, of a lubricator device for charging the fluid in the train pipe with a lubricant and a pipe connecting the exhaust port of the triple valve to the chamber at the non-pressure side of the brake cylinder piston, to thereby vent the lubricant laden air released from the brake cylinder to said non-pressure chamber.

5. In a fluid pressure brake, the combination with a brake cylinder, of means for conveying the exhaust air from the brake cylinder to the chamber at the non-pressure side of the brake piston, said means being adapted to discharge the air onto the brake cylinder walls in a spiral direction, to thereby effect a swirling action of the air.

6. In a fluid pressure brake, the combination with a brake cylinder, of means for conveying the exhaust air from the brake cylinder to the chamber at the non-pressure side of the brake piston, said means having oppositely arranged outlets adapted to discharge air onto the brake cylinder walls in opposite spiral directions.

7. In a fluid pressure brake, the combination with a brake cylinder and a lubricator device for charging the air in the brake system with a lubricant, of means for conveying the exhaust air from the brake cylinder to the chamber at the non-pressure side of the brake cylinder, said means being adapted to discharge the air onto the brake cylinder walls in a spiral direction to thereby thoroughly lubricate the brake cylinder walls by the swirling action of the air.

EDWIN A. EMERY.

Witnesses:
 Wm. M. Cody,
 A. M. Clements.

Copies of this patent may be obtained for five cents each, by addressing the "Commissioner of Patents, Washington, D. C."